(12) United States Patent
Noblett

(10) Patent No.: US 8,146,291 B2
(45) Date of Patent: Apr. 3, 2012

(54) TREE STANDS

(76) Inventor: Joseph Noblett, Chorley (GB)

( * ) Notice: Subject to any disclaimer, the term of this patent is extended or adjusted under 35 U.S.C. 154(b) by 186 days.

(21) Appl. No.: 10/565,758

(22) PCT Filed: Mar. 3, 2004

(86) PCT No.: PCT/GB2004/000893
§ 371 (c)(1),
(2), (4) Date: Apr. 18, 2006

(87) PCT Pub. No.: WO2005/016087
PCT Pub. Date: Feb. 24, 2005

(65) Prior Publication Data
US 2006/0175481 A1    Aug. 10, 2006

(30) Foreign Application Priority Data

| Aug. 6, 2003 | (GB) | 0318372.0 |
| Sep. 2, 2003 | (GB) | 0320545.7 |
| Oct. 10, 2003 | (GB) | 0323755.9 |
| Oct. 16, 2003 | (GB) | 0324240.1 |

(51) Int. Cl.
*A47G 33/12* (2006.01)
(52) U.S. Cl. ............................. 47/40.5; 47/42
(58) Field of Classification Search .......... 47/40.5, 47/41.01, 41.15, 42, 43; 248/523, 903, 529, 248/524, 527
See application file for complete search history.

(56) References Cited

U.S. PATENT DOCUMENTS

| 2,750,138 | A | | 6/1956 | Morris | |
| 3,862,733 | A | | 1/1975 | Sullivan | |
| 3,987,996 | A | * | 10/1976 | Yocca | 248/524 |
| 4,585,201 | A | | 4/1986 | Pursell | |
| 5,482,245 | A | * | 1/1996 | Graves | 248/523 |
| 6,568,127 | B1 | * | 5/2003 | Kalman et al. | 47/40.5 |

FOREIGN PATENT DOCUMENTS

| BE | 1003629 A3 | 5/1992 |
| EP | 0 369 633 A1 | 5/1990 |
| FR | 2 280 346 | 2/1976 |
| GB | 2 384 697 A | 8/2003 |

* cited by examiner

Primary Examiner — T. Nguyen
(74) Attorney, Agent, or Firm — NSIP Law

(57) ABSTRACT

The invention provides a tree stand comprising a fluid reservoir about a tree retaining member including tree gripping means, wherein the tree gripping means comprise at least one projection. The invention further provides a tree stand comprising a fluid reservoir about a tree retaining member, wherein strengthening means are provided between the fluid reservoir and the tree retaining member. The invention further provides a tree stand comprising a fluid reservoir about a tree retaining member including use, to maintain separation between at least part of the end of the tree retained by the tree retaining member and (20) a base portion of the tree retaining member.

5 Claims, 9 Drawing Sheets

TREE STANDS

FIELD OF THE INVENTION

This invention relates to tree stands, and in particular, but not exclusively to Christmas tree stands. The invention also extends to a kit; and a method of securing a tree to a tree stand.

BACKGROUND TO THE INVENTION

It is known to place cut trees in holders or stands to present the tree and enable it to be decorated with any desired items.

Particularly it is known at Christmas time to place cut trees, usually fir or spruce trees, in Christmas tree stands so that the Christmas tree may be presented in a domestic environment and decorated with appropriate Christmas decorations.

There are various types of stands available for securing a Christmas tree. One commonly used type of stand is a cut-out section of a tree trunk which has a recess cut or bored partway through the section. The cut trunk end of a Christmas tree is simply inserted into the recess in the stand. The weight of the cut-out section effects stabilization of the Christmas tree and reduces the chance of the tree toppling. The circumference of the Christmas tree is usually chosen to be substantially identical or slightly larger than the circumference of the recess in the stand, to enable a snug fit of the tree in the stand.

A problem with the above mentioned type of stand is that, due to the snug fit of the Christmas tree in the recess, there is no provision for a water reservoir which will enable the cut end of the tree to draw water and increase the working lifetime of the tree.

A second known type of stand comprises a generally cylindrical tube having a number of apertures into which can be threaded screws, and when a tree is inserted into the stand, the screws may be inserted such that they protrude into the cylinder and abut the trunk of the tree in order to tightly restrain the tree in the stand. The stand is commonly connected to, or forms part of a weighted base member which helps to prevent the tree and stand from toppling over in use.

A disadvantage with this type of stand is the need for a user to bend over or kneel in order to loosen and tighten screws once a tree has been inserted. This is particularly problematical for elderly or infirm persons. Furthermore, the screws commonly work loose over a period of time, especially if the tree is agitated, for example when being decorated.

It is therefore an aim of preferred embodiments of the present invention to overcome or mitigate a problem of the prior art, whether expressly stated herein or not.

SUMMARY OF THE INVENTION

According to the present invention there is provided a tree stand comprising a fluid reservoir about a tree retaining member, wherein strengthening means are provided between the fluid reservoir and the tree retaining member.

According to a second aspect of the invention, there is provided a tree stand comprising a fluid reservoir and a tree retaining member including tree gripping means, wherein the tree gripping means comprise at least one projection.

According to a third aspect of the invention, there is provided a tree stand comprising a fluid reservoir and a tree retaining member including spacing means, wherein the spacing means are arranged to in use maintain separation between at least part of the end of a tree retained by the tree retaining means and a base portion of the tree retaining member.

The tree stand of the invention may include a combination two or more of; tree gripping means as described herein; strengthening means as described herein; and spacing means as described herein.

Suitably the tree retaining member is mounted within the fluid reservoir. Preferably the tree retaining member does not substantially protrude from the fluid reservoir.

Preferably the fluid reservoir comprises a cylindrical or frustoconical member being closed at one end thereof, and the tree retaining member is connected to the closed end of the cylindrical or frustoconical member. Preferably the tree retaining member comprises a cylindrical member, and may be connected concentrically within the fluid reservoir to the closed end thereof.

Preferably the tree retaining member is the sole means for retaining a tree in the tree stand. Thus preferably, a tree inserted into the tree retaining member is solely retained by abutment of the tree with the interior surface of the tree retaining member and gripping means. Thus preferably the tree retaining member does not comprise mechanical means to retain a tree. Thus in order to retain a tree in the tree stand a user does not have to effect operation of any mechanical means such as screws or bolts, and does not therefore have to kneel or bend to the ground level to insert and retain the tree.

Additionally or alternatively the tree stand may comprise a diaphragm on which is mounted a tree retaining member. The tree retaining member may comprise an aperture within the diaphragm. The tree retaining member may comprise a substantially cylindrical member or a substantially frustoconical member mounted within the diaphragm. Suitably, the tree retaining member is positioned concentrically within the diaphragm.

The diaphragm is preferably arranged to be detachably connectable to the fluid reservoir, in use. Alternatively the diaphragm may be arranged to be immovably fixed to the fluid reservoir, in use.

Suitably, the diaphragm is substantially circular in plan. Suitably, the diaphragm comprises a body region and an edge region. Suitably, the edge region is arrangeable to in use contact an edge of the aperture of the fluid reservoir when the diaphragm is arranged with the fluid reservoir.

Suitably, the edge region of the diaphragm is arranged to be push fit within the aperture of the fluid reservoir. Suitably, the edge region of the diaphragm is arranged to extend above and/or below the body of diaphragm. Alternatively the edge region of the diaphragm may be arranged to be push fit on the outside of the fluid reservoir at or in the region of the aperture of the fluid reservoir.

Thus fluid from a fluid reservoir is largely prevented from spillage by the diaphragm. Spillage may be a problem when a tree is transported in place in a tree stand, or if a tree stand is accidentally knocked or tipped.

Preferably the diaphragm comprises a passageway therein which effects fluid communication between the exterior and interior of the fluid reservoir.

Preferably the diaphragm comprises a plurality of passageways to effect fluid communication between the exterior and interior of the fluid reservoir.

Suitably, an end of the or each passageway is located at a relatively low point on the diaphragm when the stand is arranged with a fluid reservoir.

Suitably the passageway or passageways are formed at or near to the tree-retaining member. Suitably, the passageway or passageways are formed toward the centre of the diaphragm.

Suitably, the passageways or passageways are defined by a tube.

Suitably, the tree-retaining member comprises a cut out section to provide a passageway. In this instance the passageway is in use defined by the tree and the tree-retaining member. Suitably, the edge region of the diaphragm comprises a cut out section to provide a passageway. In this instance the passageway is in use defined by the edge region of the diaphragm and an edge of the aperture of the fluid reservoir. Suitably, the tree-retaining member and/or edge region of the diaphragm comprise a plurality of cut out sections.

Suitably, the tree gripping means comprises a plurality of projections arranged on the interior surface of the tree retaining member, preferably in radial fashion.

Suitably, the projections comprise veins running substantially axially with the tree retaining member. Suitably, the tree gripping means comprises two or more, more preferably three or more, still more preferably five or more and most preferably ten or more veins. Suitably, the veins are arranged to maintain a degree of separation between the tree trunk and portions of the interior surface of the tree retaining member.

The projections may include a sharp or pointed portion arranged in use to at least partially penetrate the trunk of a tree inserted into the tree retaining member.

Preferably the cylindrical length of the tree retaining member is substantially identical to or less than the cylindrical length of the fluid reservoir.

In a preferred embodiment the fluid reservoir and tree retaining member both comprise generally cylindrical members with the tree retaining member being connected concentrically within the fluid reservoir to the closed end of the fluid reservoir.

Suitably, the fluid reservoir and tree retaining member are in fluid communication. Preferably the tree retaining member comprises an aperture therein which effects fluid communication between the tree retaining member and the fluid reservoir.

Suitably, the aperture is formed at or near to the portion of the tree retaining member connected to the fluid reservoir.

There may be a plurality of apertures in the tree retaining member, each aperture effecting fluid communication between the reservoir and tree retaining member.

Suitably, the strengthening means comprises a rib. Suitably, the strengthening means comprises a plurality of ribs. Suitably, the strengthening means comprises at least three, preferably at least four ribs. Suitably, the ribs are disposed at substantially even intervals about the tree retaining member. Suitably, the ribs are substantially identical.

Suitably, the ribs extend from the tree retaining member toward the fluid reservoir. Suitably, the ribs connect between the tree retaining member and the fluid reservoir. Suitably, the ribs protrude from the closed end of the fluid reservoir.

Suitably, the ribs comprise sheet material. The ribs may comprise substantially planar pieces of sheet material. The ribs may comprise open channels. The open channels may comprise a curved end portion. The ribs may comprise tubes, or bars of material. The ribs may comprise at least part of the fluid reservoir; and may be formed from part of the base of the fluid reservoir.

The ribs may comprise hollow ribs. The hollow ribs may be in fluid communication with the tree retaining member, preferably by means of a mutual aperture. Preferably the hollow rib comprises means to effect fluid communication between the fluid reservoir and the tree retaining member. The means may comprise one or more aperture in the rib wall.

The hollow ribs may be formed from shaped portions of the fluid reservoir, preferably shaped portions of the base of the fluid reservoir.

Suitably, the ribs may comprise guiding means arranged to in use assist in the association of a tree with the tree retaining member. Suitably, the guiding means comprise at least one guiding surface arranged at an angle to the tree retaining member. Suitably, the or each guiding surface comprises a substantially planar surface. Suitably, the or each guiding surface projects upward and outward from the tree retaining member. Suitably, a guiding surface is associated with each rib.

Suitably, the spacing means comprises at least one projection arranged to protrude from the base of the tree retaining member. Suitably, the projection comprises a domed projection. Suitably, the projection is arranged concentrically with the tree retaining member.

The tree stand may further comprise weighting means. Preferably the weighting means comprises a base member which may be connected to the fluid reservoir or formed integrally with the fluid reservoir.

Preferably the base member comprises a plurality of legs, which in use, are arranged to engage a surface on which the tree stand is mounted.

The tree stand may be of any suitable material, but is preferably metal (including alloy) and is more preferably constructed from iron, cast iron, aluminium or stainless steel.

According to a fourth aspect of the present invention there is provided a kit comprising a tree stand of the first, second or third aspect of the invention and a tree.

Preferably the tree is a cut tree suitable for use as a Christmas tree.

Suitably the cut tree comprises a trunk which in the region of the cut end thereof, has a circumference substantially identical to the interior circumference of the tree retaining member.

According to a fifth aspect of the present invention there is provided a method of securing a cut tree in a tree stand, the method comprising the steps of:
(a) providing a tree stand comprising a fluid reservoir about a tree retaining member, wherein strengthening means are provided between the fluid reservoir and the tree retaining member;
(b) shaping a portion of the trunk of the cut tree at the cut end of the tree such that its surface dimensions are substantially identical to the interior dimensions of the tree retaining member; and
(c) inserting the shaped portion of the trunk into the tree retaining member such that the tree is secured to the interior of the tree retaining member by abutment of the tree with the interior surface of the tree retaining member.

According to a sixth aspect of the present invention there is provided a method of securing a cut tree in a tree stand, the method comprising the steps of:
(a) providing a tree stand comprising a fluid reservoir and a tree retaining member including tree gripping means, wherein the tree gripping means comprise at least one projection;
(b) shaping a portion of the trunk of the cut tree at the cut end of the tree such that its surface dimensions are substantially identical to the interior dimensions of the tree retaining member; and
(c) inserting the shaped portion of the trunk into the tree retaining member such that the tree is secured to the interior of the tree retaining member by abutment of the tree with the interior surface of the tree retaining member.

According to a seventh aspect of the present invention there is provided a method of securing a cut tree in a tree stand, the method comprising the steps of:

(a) providing a tree stand comprising a fluid reservoir and a tree retaining member including spacing means arranged to in use maintain separation between at least part of the end of the curt tree retained by the tree retaining means and a base portion of the tree retaining member;

(b) shaping a portion of the trunk of the cut tree at the cut end of the tree such that its surface dimensions are substantially identical to the interior dimensions of the tree retaining member; and (c) inserting the shaped portion of the trunk into the tree retaining member such that the tree is secured to the interior of the tree retaining member by abutment of the tree with the interior surface of the tree retaining member.

The tree may therefore be gripped by the gripping means within the tree retaining member to more securely hold the tree in the tree stand.

The tree may therefore be at least partially separated from the base of the tree retaining member by the spacing means to allow fluid access to a complementary portion of the base of the tree.

By "cut tree" we mean a tree which has been cut by any suitable means to provide a cut end of the trunk of the tree distal to the apex of the tree. Thus trees may be cut by chopping, cutting, sawing and the like for example.

The cut end of the trunk of the tree may be shaped by any suitable means, including sawing, chopping, shaving, planing or the like.

Preferably the method further comprises the step of adding water to the fluid reservoir, and water may be added to partly or completely fill the reservoir.

Preferably the tree stand is as described for the first or second aspect of the invention.

BRIEF DESCRIPTION OF THE DRAWINGS

For a better understanding of the various aspects of the invention, and to show how embodiments of the same may be put into practice, a specific embodiment will now be described, with reference to the accompanying drawings, in which.

DESCRIPTION OF THE PREFERRED EMBODIMENT

Figure 1:
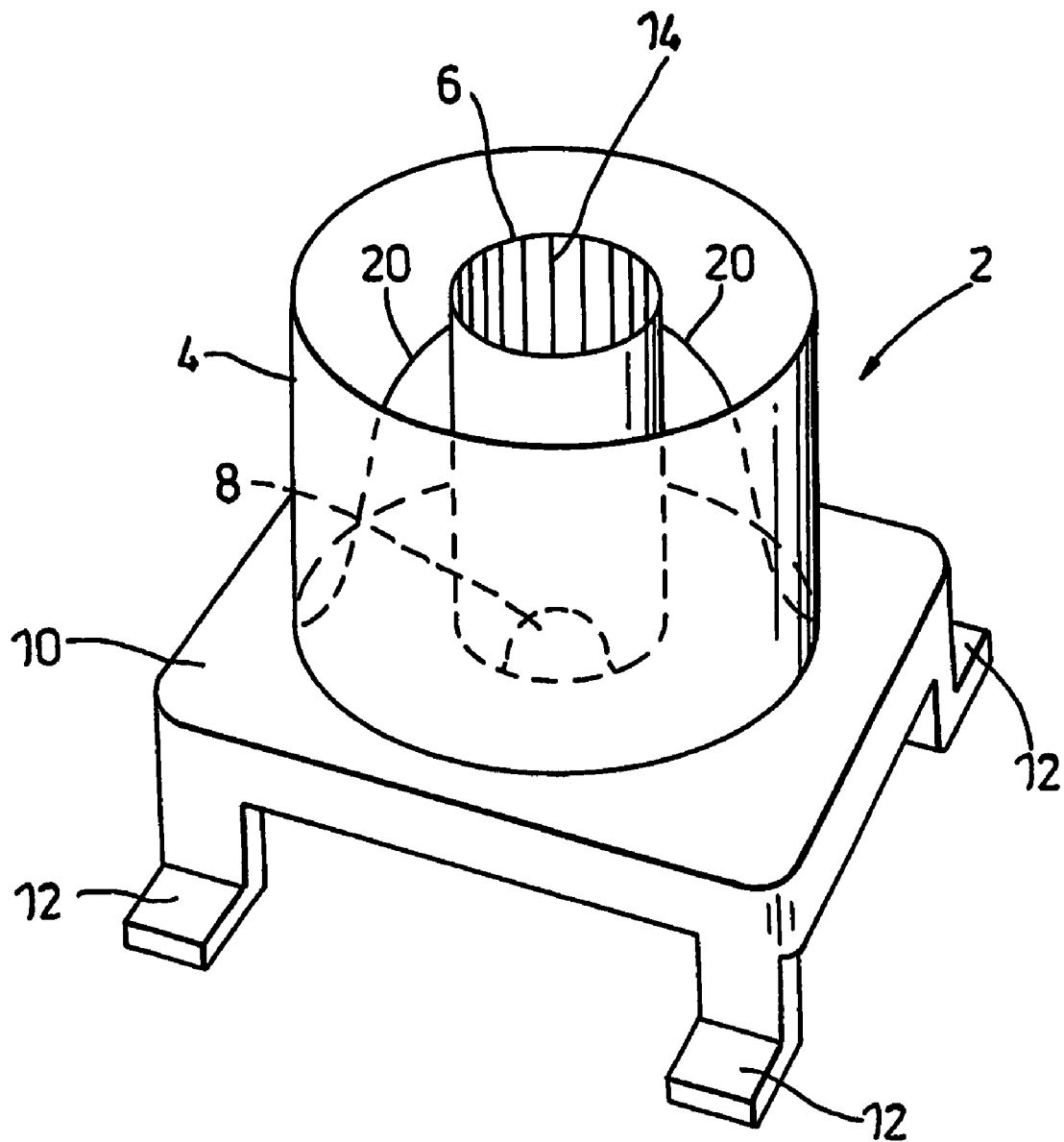
FIG. 1 illustrates an upper perspective view of a first preferred embodiment of the tree stand of the invention.
Figure 2:
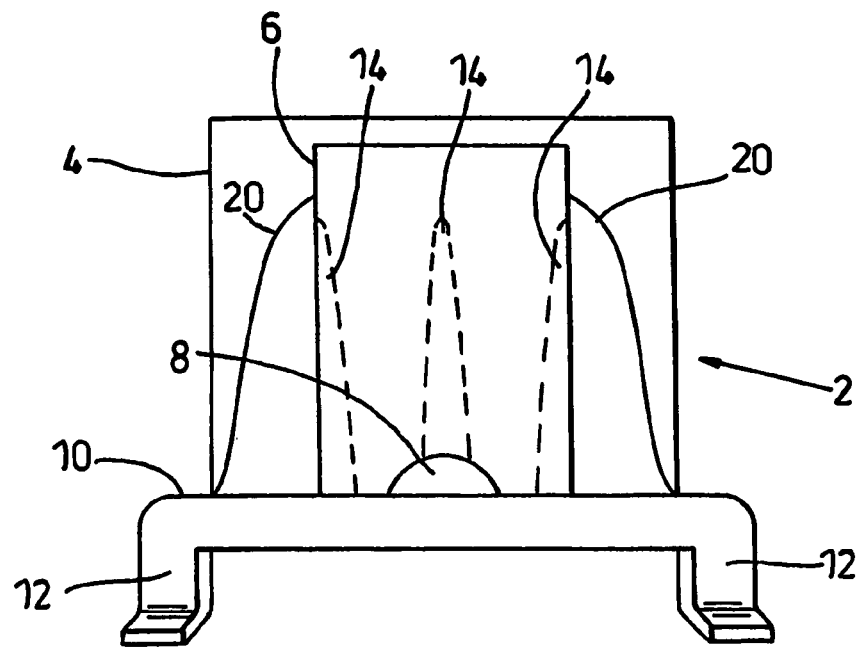
FIG. 2 illustrates a side sectional view of the embodiment shown in FIG. 1.
Figure 3:
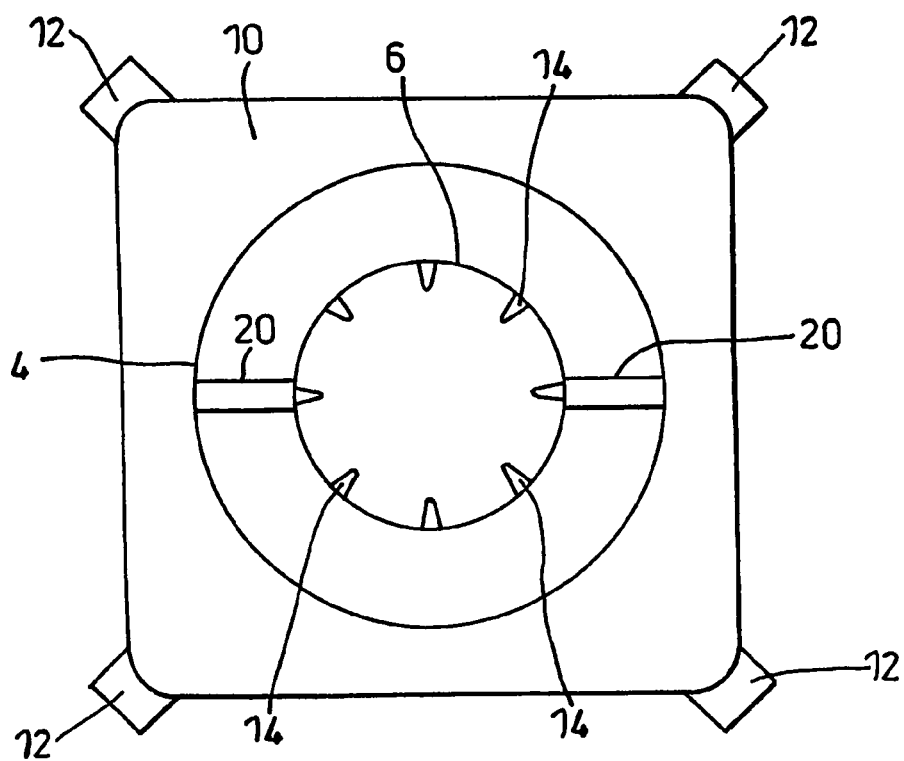
FIG. 3 illustrates a plan view of the embodiment of FIGS. 1 and 2.

Referring to FIGS. 1 to 3 a tree stand 2 comprises a weighting means in the form of a base 10 which includes four legs 12. Connected to the base 10 is a fluid reservoir 4 which is cylindrical in shape. Connected concentrically within the fluid reservoir 4 on the base 10, is a tree retaining member 6 which is cylindrical in shape. Between the tree retaining member 6 and the fluid reservoir are ribs 20 made up from substantially planar sheet material. The tree retaining member 6 comprises an aperture 8 located at the connection between the retaining member 6 and the base 10, which allows fluid communication between the retaining member 6 and the fluid reservoir 4. The tree retaining member 6 further comprises tree gripping means 14 to help hold the tree in place.

In use, a tree, such as a Christmas tree, which has been cut down by any suitable means, first has its trunk, at the cut end thereof, shaped to substantially the identical circumference as the interior circumference of the retaining member 6.

The cut end of the tree is then inserted into the retaining member 6. As the circumference of the cut end of the tree is substantially identical to the interior circumference of the retaining member 6, the tree is held tight in the tree stand 2 without the need to use any mechanical means such as screws, bolts or the like, to secure the tree in the stand and prevent it moving about within the stand. As mechanical means are not needed to secure the tree, the tree stand of the embodiment shown in FIGS. 1-3 is easy to use and a tree can be inserted without the user having to bend down to ground level and actuate mechanical means. Thus the tree stand 2 is particularly suited for use to elderly and infirm persons.

The tree gripping means 14 comprises a plurality of projections arranged around the interior surface of the tree retaining member 6. The projections comprise veins running substantially axially with the tree retaining member arranged to maintain a degree of separation between the tree trunk and portions of the interior surface of the tree retaining member 6. In use the veins can grip the surface of a tree trunk to prevent rotation of the tree about its axis relative to the tree stand 2, and resist lifting of the tree relative to the tree stand 2. Furthermore, the separation between certain portions of the tree trunk and the tree retaining member 6 allows fluid to move within the tree retaining member 6.

When the tree has been inserted into the stand 2, water is then poured into the fluid reservoir 4 to a desired level. The presence of the aperture 8 in the retaining member 6 allows water to flow into the interior of the retaining member 6 around the cut end of the tree. Thus water can be absorbed through the cut end of the tree in order to increase the useful life of the tree, and reduce dehydration of the tree.

The base 10 of the stand 2 helps to weight the stand 2 and tree to prevent the tree from toppling in use or when.

The ribs 20 strengthen the stand 2, and reduce the likelihood that the tree retaining member is damaged when the tree is inserted, or when the tree is agitated or accidentally knocked.

Figure 4:
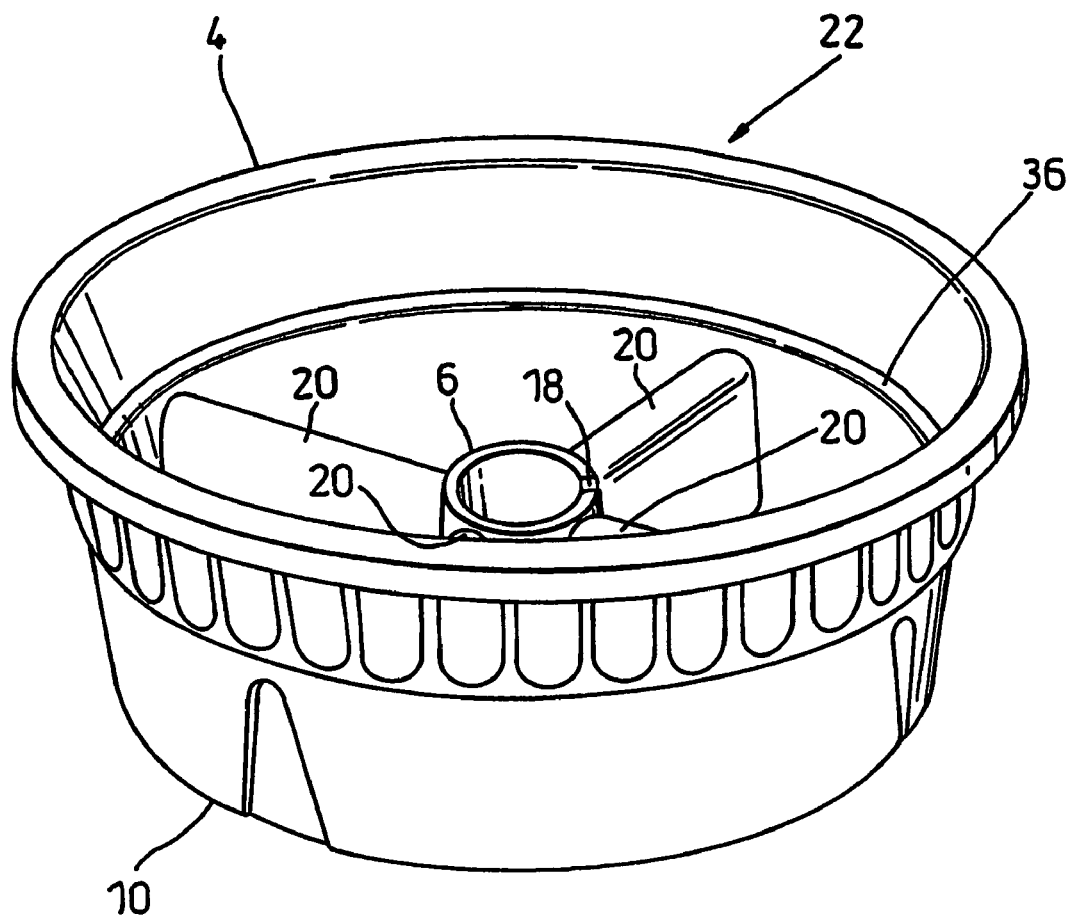
FIG. 4 illustrates an upper perspective view of a second preferred embodiment of the tree stand of the invention.
Figure 5:
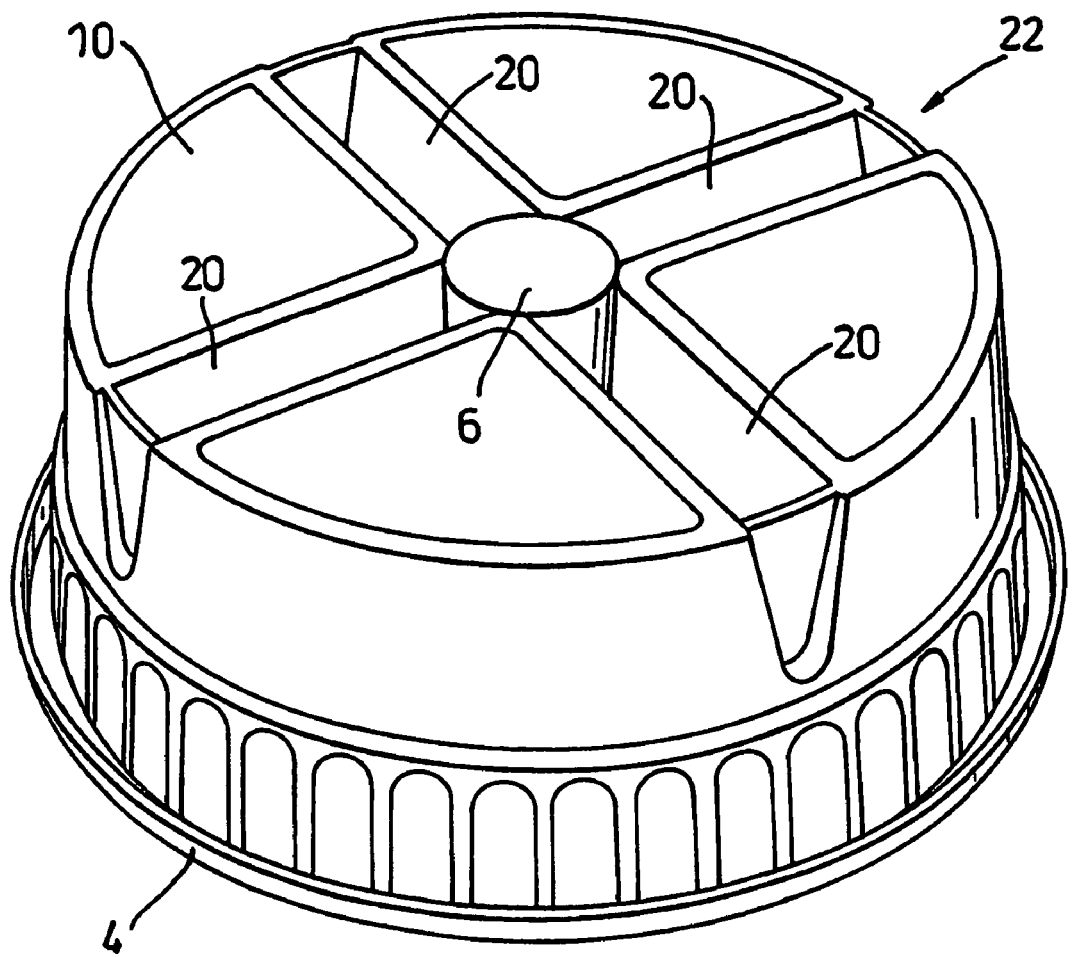
FIG. 5 illustrates a lower perspective view of the embodiment of FIG. 1.

FIGS. 4 and 5 show a second tree stand 22 comprising a tree retaining member 6 and a fluid reservoir 4, and a base 10, along with four ribs 20 and a slot 18. The fluid reservoir 4 is a substantially frustoconical shape closed at one end by the base 10, and open at the other end. The fluid reservoir 4 includes a ledge 36, arranged to co-operate with an edge of a separate diaphragm (not shown). The tree retaining member is substantially cylindrical, and includes a slot 18 cut in the curved surface to allow fluid communication between the tree retaining member 6 and the fluid reservoir 4. Additional slots or apertures may be provided in the tree retaining member to allow fluid communication between other portions of the fluid reservoir 4 and the tree retaining member 6.

The ribs 20 are disposed at right angles to one another around the tree retaining member 6, and extend across the base 10 to couple the tree retaining member 6 to the fluid reservoir 4. The ribs 20 comprise hollow, arched channels of sheet material to give strength without adding significantly to the amount of material needed to form the tree stand 22.

In alternative embodiments the ribs 20 may be connected between the tree retaining member 6 and the fluid reservoir 4 without contacting the base, or with cut-out sections arranged to allow fluid free passage around the base 10. The ribs 20 may include means to effect fluid communication between the reservoir 4 and tree retaining member 6, such as an aperture for example.

Figure 6:
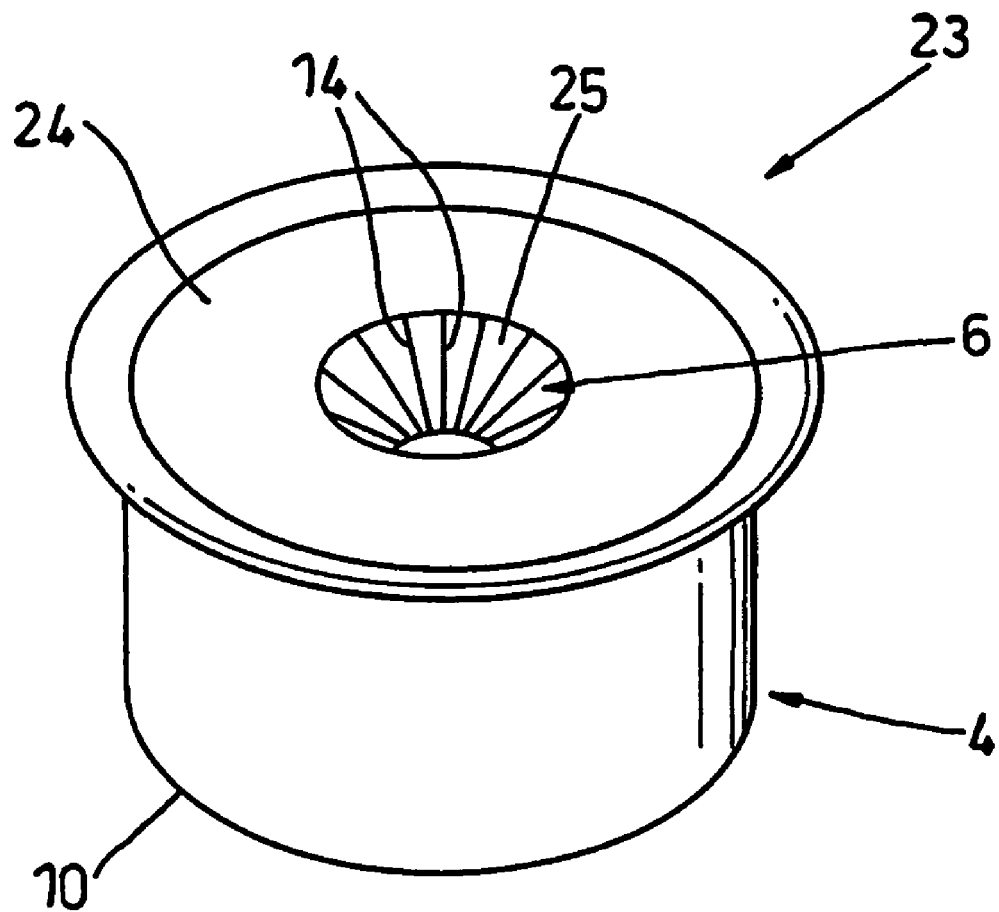
FIG. 6 illustrates an upper perspective view of a third preferred embodiment of the tree stand of the invention.
Figure 7:
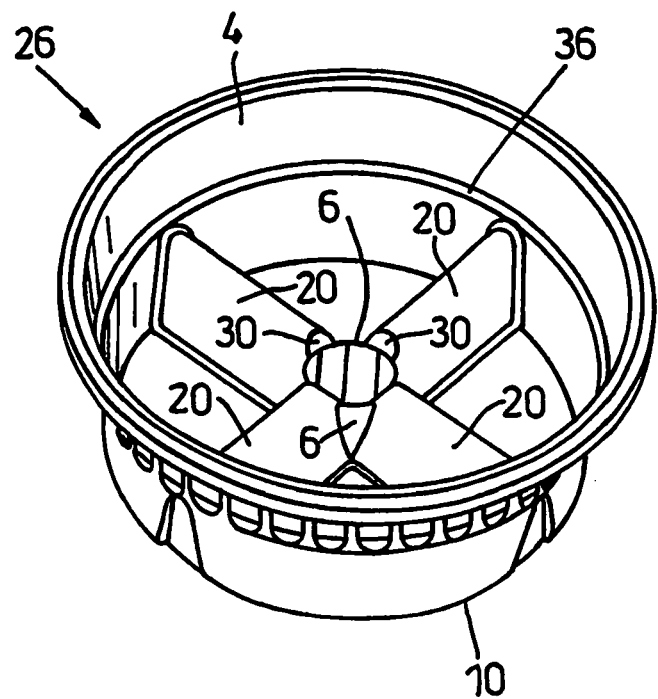
FIG. 7 illustrates an upper perspective view of a fourth preferred embodiment of the tree stand of the invention.
Figure 8:
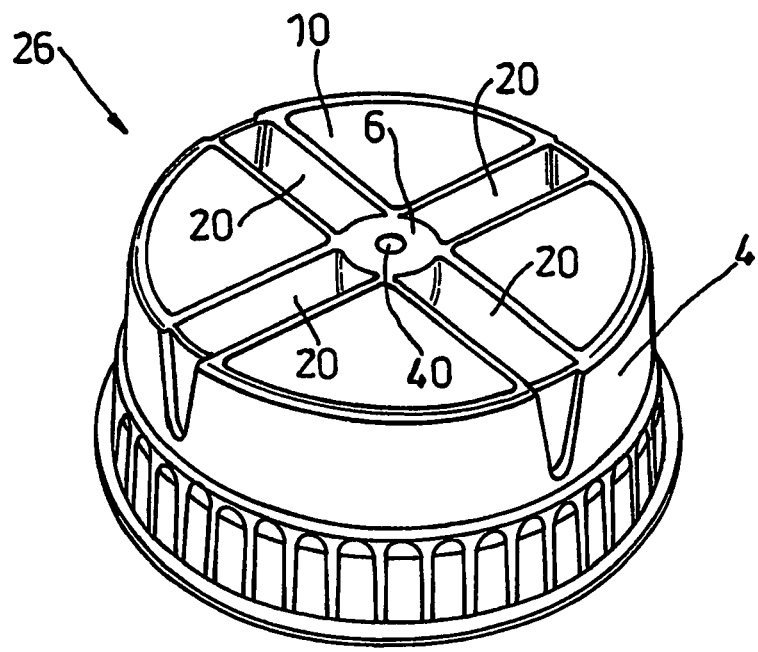
FIG. 8 illustrates a lower perspective view of the embodiment of FIG. 7.

Referring now to FIG. 6 there is shown a third tree stand 23 according to a preferred embodiment of the present invention. The tree retaining member 6 comprises a substantially frustoconical member 25 mounted within a diaphragm 24.

The diaphragm 24 is detachably coupled to a fluid reservoir 4 by push fitting into an open end of the fluid reservoir 4. The tree retaining member 6 includes tree gripping means 14 comprising a plurality of projections arranged around the interior surface of the tree retaining member 6.

In addition to the tree retaining member 6 of the diaphragm, a tree retaining member 6 may be provided in the base 10 of the fluid reservoir 4. The fluid reservoir 4 may comprise the tree stand 2 or 22 of the first or second preferred embodiments.

Figure 9:
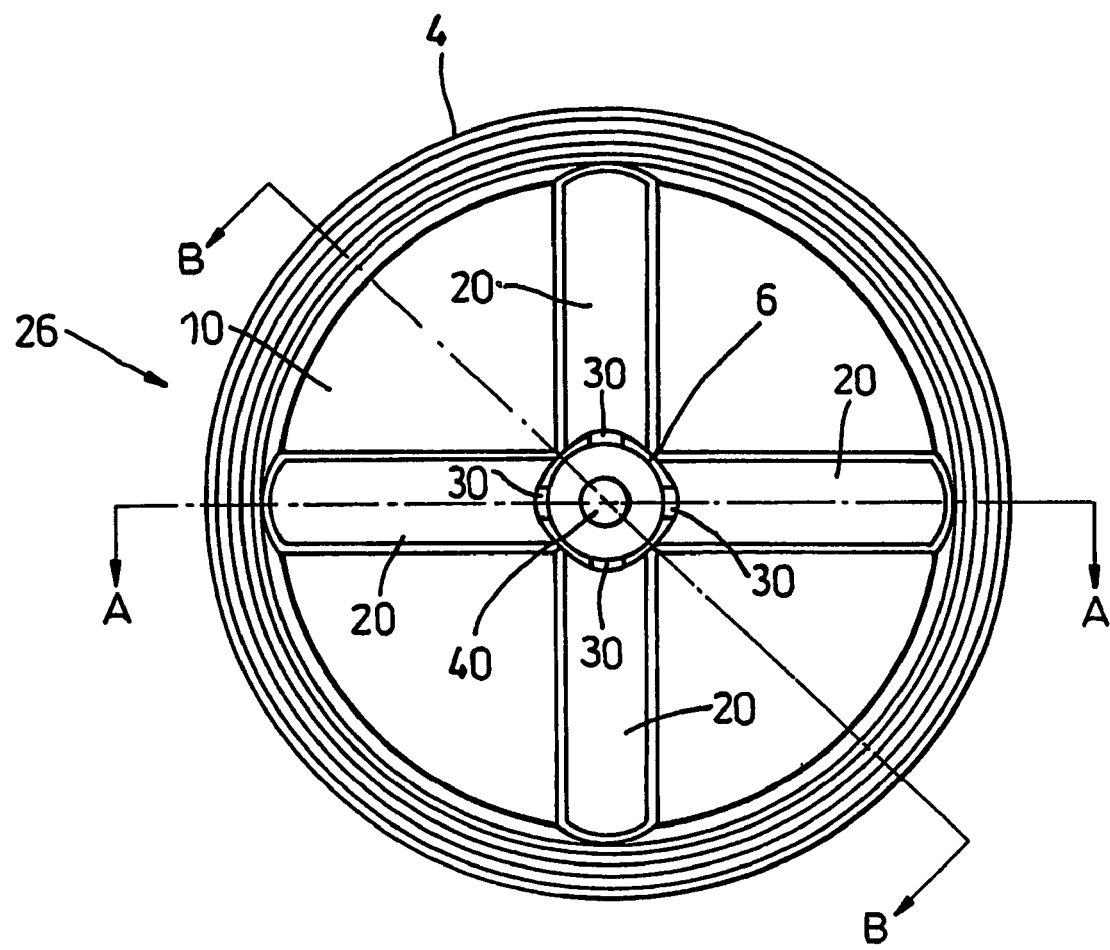
FIG. 9 illustrates a plan view of the embodiment of FIGS. 7 and 8.
Figure 10:
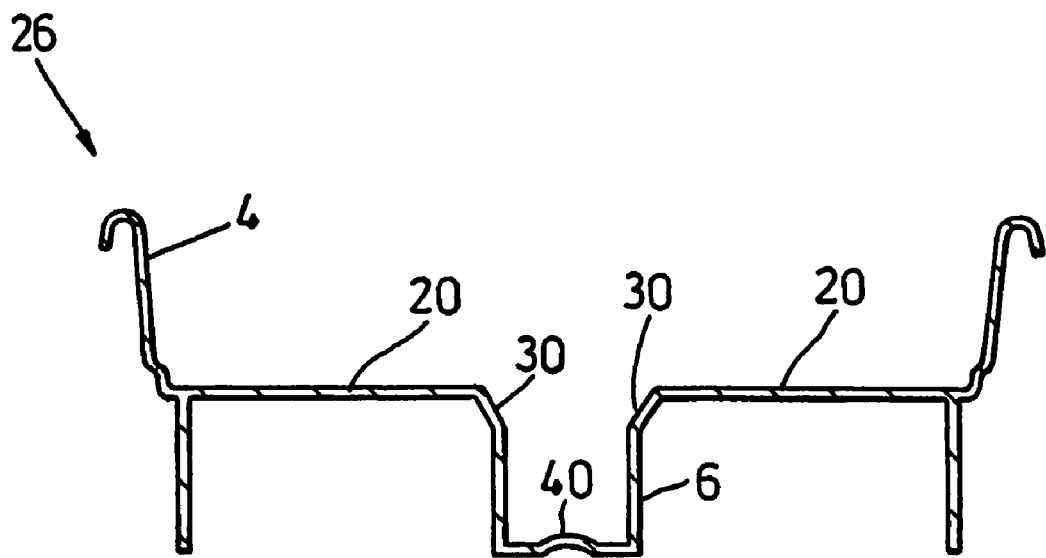
FIG. 10 illustrates a sectional view of the embodiment of FIGS. 7 to 9 about the line A-A looking in the direction of the arrows.
Figure 11:
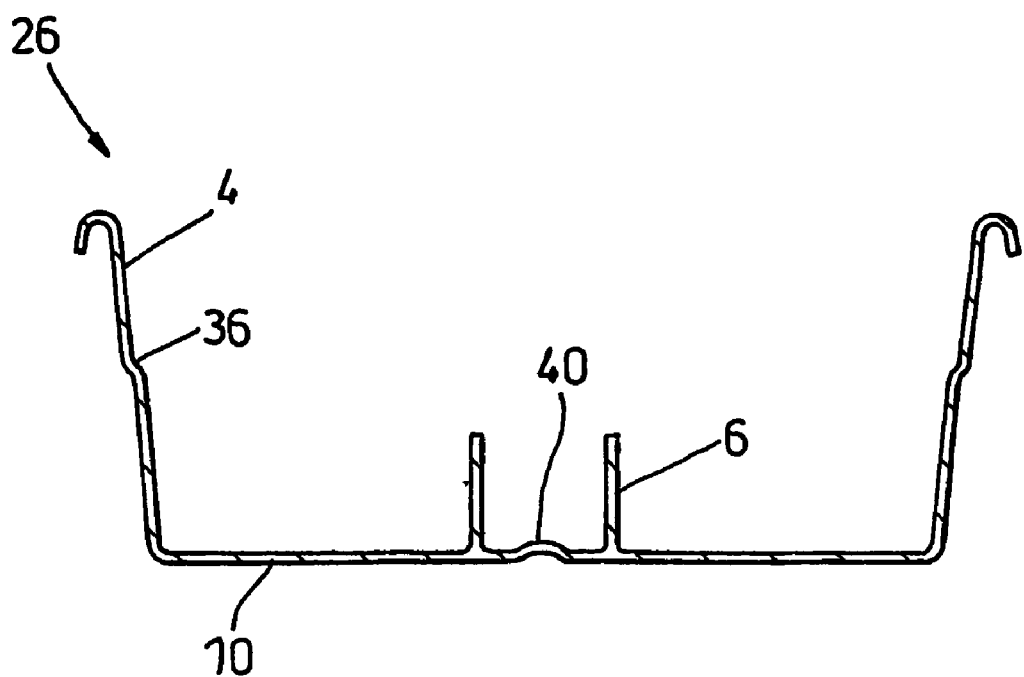
FIG. 11 illustrates a sectional view of the embodiment of FIGS. 7 to 10 about the line B-B looking in the direction of the arrows.

FIGS. 9 to 11 show a fourth tree stand 26 comprising a tree retaining member 6 and a fluid reservoir 4, and a base 10, along with four strengthening ribs 20. The fluid reservoir 4 is a substantially frustoconical shape closed at one end by the base 10, and open at the other end. The tree retaining member is substantially cylindrical.

The ribs 20 are disposed at right angles to one another around the tree retaining member 6, and extend across the base 10 to couple the tree retaining member 6 to the fluid reservoir 4. The ribs 20 comprise hollow, arched channels of sheet material to give strength without adding significantly to the amount of material needed to form the tree stand 22. The ribs form part of the fluid reservoir 4.

The ribs 20 comprise guiding means 30 that couple to the tree retaining member 6. The guiding means 30 comprise substantially planar surfaces that project upwardly and outwardly from an upper portion of the tree retaining member 6 at an angle of approximately 30 degrees to the vertical. As a tree is inserted into the tree stand 26 it may be imperfectly aligned with the tree retaining member 6, either by rotationally or positionally. In these circumstances the trunk of the tree may contact the guiding means 30 and thereby be guided toward and into the tree retaining member 6 as the tree is lowered.

The tree stand 26 further includes spacing means comprising a projection 40 arranged to protrude from the base of the tree retaining member 6. The projection 40 comprises a hollow dome formed in the base of the tree retaining member and arranged concentrically with the tree retaining member. When a tree is positioned within the tree retaining member 6 a portion of the base of the tree trunk abuts the projection 6, thereby maintaining a space between the rest of the base of the tree trunk and the tree retaining member. In this way water present in the tree retaining member may be taken up by the tree, as water is not denied access to the base of the tree trunk by virtue of the abutment of the whole of the tree trunk with the base of the tree retaining member.

Figure 12:
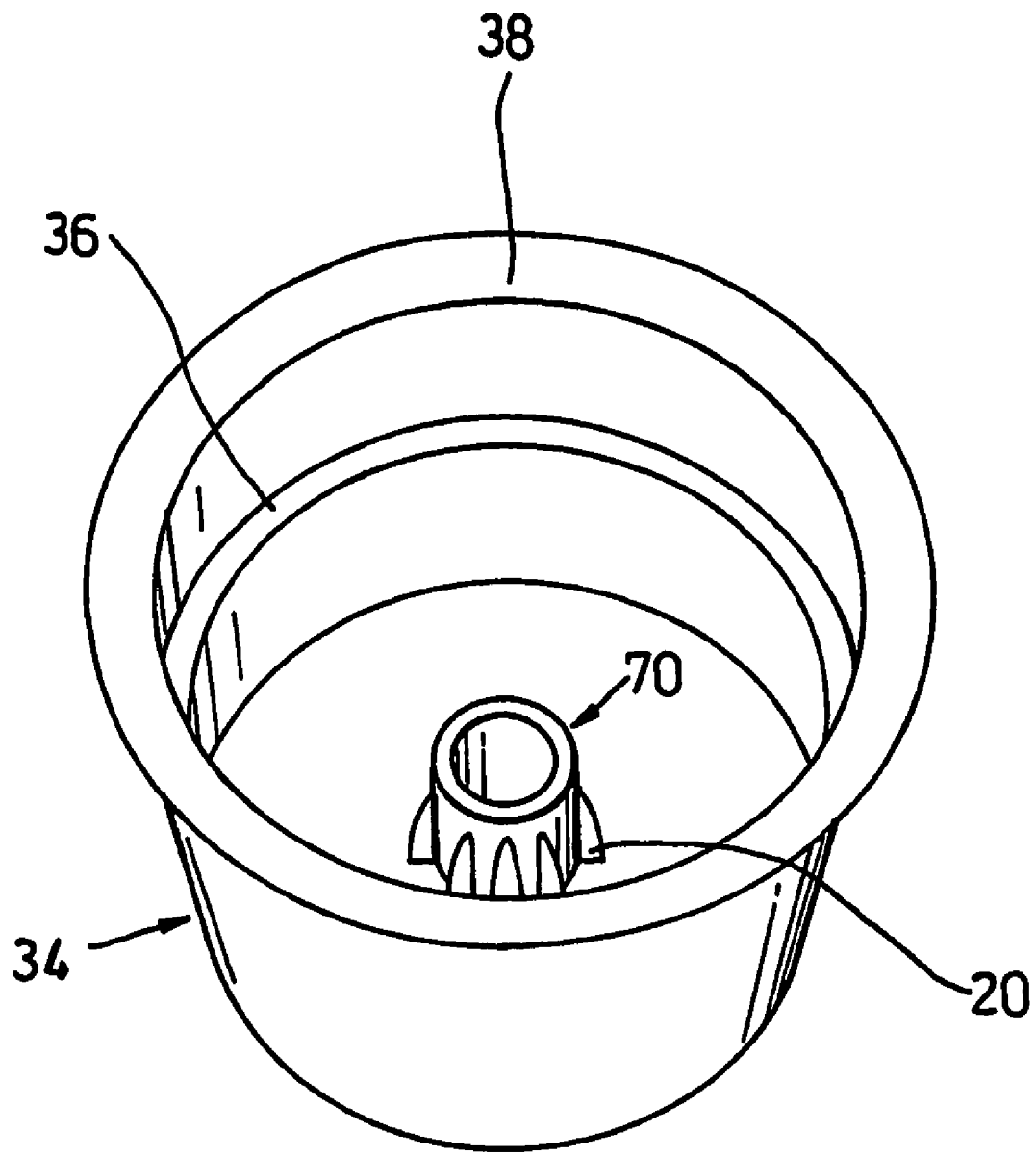
FIG. 12 illustrates a fluid reservoir useful in the invention.

Referring now to FIG. 12, a tree stand of the invention is shown in more detail. A fluid reservoir 34 comprises an aperture 38, the edge of which may be arranged to complement the edge of a diaphragm (not shown) to ensure a water tight seal at the interface of the fluid reservoir 34 and the edge of the diaphragm. Also shown in FIG. 12 is a ledge 36. The ledge 36 can help support a diaphragm while in use with the fluid reservoir 34 and acts as a stop to prevent a diaphragm from passing too far within the fluid reservoir 34. FIG. 12 also shows a tree base-retaining means 70 formed at the centre of a base of the fluid reservoir (including gripping means on the inside thereof, not shown). The fluid reservoir 34 also includes strengthening means extending from the base-retailing means 70 to the bottom of the fluid reservoir 34.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiments( ). The invention extend to any novel one, or any novel combination, of the features disclosed in this specification (including any accompanying claims, abstract and drawings), or to any novel one, or any novel combination, of the steps of any method or process so disclosed.

The invention claimed is:
1. A tree stand comprising:
a fluid reservoir about a tree retaining member including tree gripping means,
wherein the fluid reservoir comprises a cylindrical or frustoconical member being closed at one end thereof by a base,
wherein the tree retaining member is connected to the base,
wherein the tree retaining member comprises an aperture located at a connection between the retaining member and the base and the tree retaining member comprises a substantially cylindrical hollow member,
wherein the tree gripping means comprises a plurality of projections arranged on the interior surface of the tree retaining member and extending in a radial fashion, inwardly from an interior surface of the tree retaining member,
wherein the projections run substantially axially with the tree retaining member and include a sharp or pointed portion to at least partially penetrate the trunk of a tree inserted into the tree retaining member, and wherein the tree retaining member is configured to hold a tree inserted therein without using any moveable mechanical means in the form of screws or bolts by resisting lifting of a tree inserted therein relative to the tree stand.

2. A tree stand as claimed in claim 1, wherein the tree retaining member does not substantially protrude from the fluid reservoir.

3. A tree stand as claimed in claim 1, wherein the projections are arranged to maintain a degree of separation between a tree trunk inserted into the tree stand, and portions of the interior surface of the tree retaining member.

4. A tree stand as claimed in claim 1 wherein the fluid reservoir and tree retaining member are in fluid communication.

5. A tree stand as claimed in claim 1, wherein the aperture comprises a slot cut in a curved surface of the tree retaining member.

* * * * *